(12) United States Patent
McKay et al.

(10) Patent No.: US 8,496,141 B2
(45) Date of Patent: Jul. 30, 2013

(54) FROZEN CONFECTION MACHINE HAVING SIMULTANEOUS DISPENSING OF TWO FLAVORS WITH CLOG INHIBITING MECHANISM

(75) Inventors: Sean A. McKay, Hampton, IL (US); James A. Quandt, East Moline, IL (US)

(73) Assignee: H. C. Duke & Son LLC, East Moline, IL (US)

( * ) Notice: Subject to any disclaimer, the term of this patent is extended or adjusted under 35 U.S.C. 154(b) by 980 days.

(21) Appl. No.: 12/499,398

(22) Filed: Jul. 8, 2009

(65) Prior Publication Data

US 2011/0006079 A1      Jan. 13, 2011

(51) Int. Cl.
| | |
|---|---|
| *B67D 7/06* | (2010.01) |
| *B67D 7/78* | (2010.01) |
| *G01F 11/00* | (2006.01) |
| *F25D 17/00* | (2006.01) |

(52) U.S. Cl.
USPC .................. 222/144.5; 222/145.5; 222/228; 62/179

(58) Field of Classification Search
USPC ............. 222/144.5, 145.5, 145.1, 146.6, 148, 222/149, 509, 506, 228, 129.1, 448, 443, 222/322, 320, 318, 226; 99/275; 62/179, 62/523, 342, 343
See application file for complete search history.

(56) References Cited

U.S. PATENT DOCUMENTS

| | | |
|---|---|---|
| 3,052,381 A | 9/1962 | Carpigiani |
| 3,229,477 A | 1/1966 | Erickson |
| 3,276,633 A | 10/1966 | Ranhauser |
| 3,330,129 A | 7/1967 | Halverson et al. |
| 3,787,145 A | 1/1974 | Keyes et al. |
| 3,868,050 A | 2/1975 | Gorychka et al. |
| 3,898,866 A | 8/1975 | Keyes et al. |
| 3,934,427 A | 1/1976 | Keyes |
| 3,934,759 A | 1/1976 | Giannella et al. |
| 3,945,614 A | 3/1976 | Suzuki et al. |
| 3,989,492 A | 11/1976 | Keyes |
| 3,995,770 A | 12/1976 | Schwitters |
| 4,116,369 A | 9/1978 | Crowder |
| 4,184,613 A | 1/1980 | Kinney |
| 4,544,085 A | 10/1985 | Frazer |

(Continued)

FOREIGN PATENT DOCUMENTS

| | | |
|---|---|---|
| JP | 11-123051 A | 5/1999 |
| KR | 10-2006-0120876 A | 11/2006 |

OTHER PUBLICATIONS

Item 6, "Buster-Ice" of the Beater Door Assembly on p. 8 of the Operator Parts Identification Manual, Shake/Slush Freezer, Model 428, Operating Instructions (Cover, Table of Contents, pp. 4-8), Copyright Feb. 2001 by Taylor Company, Rockton, Illinois.

*Primary Examiner* — Kevin P Shaver
*Assistant Examiner* — Stephanie E Williams
(74) *Attorney, Agent, or Firm* — Woodard, Emhardt, Moriarty, McNett & Henry LLP (57) ABSTRACT

A frozen beverage freezer machine is provided with two side-by-side freezer cylinders containing different flowable frozen beverage products. Draw valves are provided to draw the beverages separately for dispensing separately from the two beverage freezer cylinders. An additional draw valve, generally centered relative to the freezer cylinders, is provided to draw beverages from the two cylinders simultaneously for dispensing a mix of the two beverages. Clog breaker blades are coupled to the center draw valve assembly to inhibit clogging of passageways from the frozen beverage cylinders to the center valve, to facilitate reliable flow and mixing of the two beverages when the center valve is opened to dispense the mix into a user's receiver cup.

17 Claims, 11 Drawing Sheets

U.S. PATENT DOCUMENTS

| | | |
|---|---|---|
| 4,580,905 A | 4/1986 | Schwitters et al. |
| 5,212,954 A | 5/1993 | Black et al. |
| 5,419,150 A | 5/1995 | Kaiser et al. |
| 5,709,095 A | 1/1998 | Johnson |
| 5,743,640 A | 4/1998 | Crossley |
| 5,799,832 A | 9/1998 | Mayo |
| 7,290,682 B2 | 11/2007 | Harra |

FROZEN CONFECTION MACHINE HAVING SIMULTANEOUS DISPENSING OF TWO FLAVORS WITH CLOG INHIBITING MECHANISM

BACKGROUND

A common practice for restaurants and other food service establishments that serve slush, "smoothies", or frozen cocktail drinks from a dispensing freezer, is to combine different flavors from several machines to create new drinks. This requires having more than one machine, or having machines with two or more dispensing heads, with the machine user (server) then alternately dispensing from the different heads to provide the desired combination of flavors.

An effort to address this problem is represented in U.S. Pat. No. 3,330,129 issued Jul. 11, 1967. This patent discloses dispensing a frozen confection into a user's cup, with flavor selection from one or the other of two side-by-side freezer cylinders. This patent discloses one valve for the left side cylinder, and another for the right side cylinder, and a third in the middle for simultaneously dispensing from both cylinders using a dual dispensing valve. While this approach might work well for soft serve product, there is a tendency for freezes or slushes or similar icy confections to clog in the longer delivery passageways between the two freezer cylinders and the dual dispensing middle valve.

Because of the practical requirement in some cases to provide some separation distance between the cylinders (in order to provide adequate room for refrigeration circuitry, sealing surfaces, etc.), the distance between each cylinder agitator and the common central port is such that there is a volume of frozen product that is beyond the reach of the cylinder agitator. The nature of many slush-based products is such that when they are allowed to sit without agitation, the liquid separates from the ice crystals, and the ice crystal portion can become densely packed and may form a clog, due to its weight and/or the mechanical packing action of a stirrer or agitator operating nearby in a frozen confection product supply freezer cylinder. We have found that this tendency must be successfully addressed in order for the central dual dispensing valve port to operate effectively.

So there is a need to address these problems, and the present invention does so for improving performance, versatility and reliability of simultaneous dispensing to a user's cup, of frozen beverages from two sources in a frozen-confection freezer system. To do so, one embodiment of the invention incorporates a mechanism in at least one delivery passageway to the dual dispensing valve, to inhibit clogging and break up clogs that might form and which might otherwise impair the flow of freezes, slushes, or similar icy confections.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended.

Referring now to the drawings in detail, a frozen beverage freezer machine 11, which may be floor-mounted, table-mounted, or otherwise mounted, has two beverage freezer cylinders 12 and 29 which can be of conventional construction and mounted side-by-side to the freezer. Each of the cylinders, such as cylinder 12 for example in FIG. 2, has an open end at the face 16 of the freezer. Dispenser head 14 is secured to the front 16 of the freezer by fasteners (not shown) through holes 61 in the head and anchored in the freezer. Therefore, at each cylinder the open end is exposed to back face 33 (FIG. 2) of a shallow, cylinder-receiver recess defined by flange 34. A seal ring 31 is received in groove 32 to seal the head to the cylinder 12.

Figure 1:
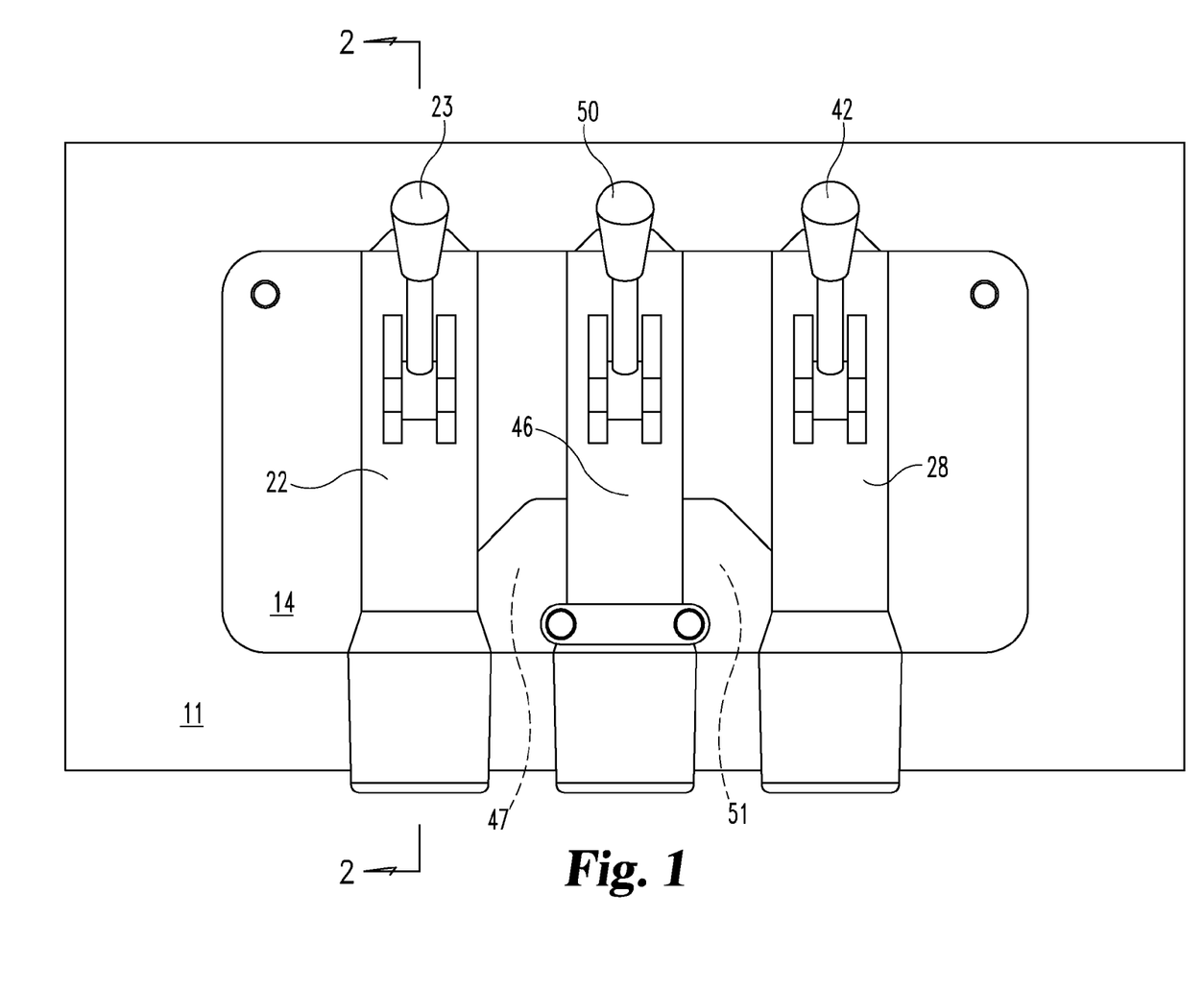
FIG. 1 is a front view of a portion of a conventional type of frozen beverage freezer with a beverage selection and dispensing head assembly mounted to it and which incorporates a typical embodiment of the present invention.
Figure 1A:
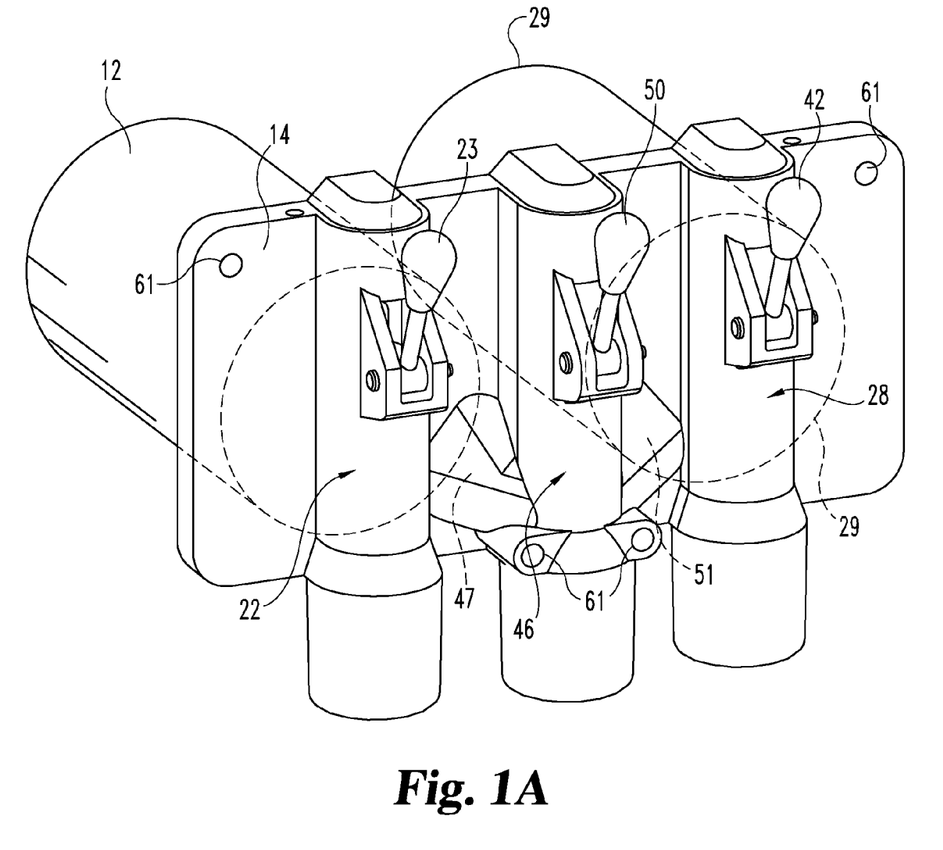
FIG. 1A is a perspective view of the dispensing head assembly of FIG. 1.
Figure 2:
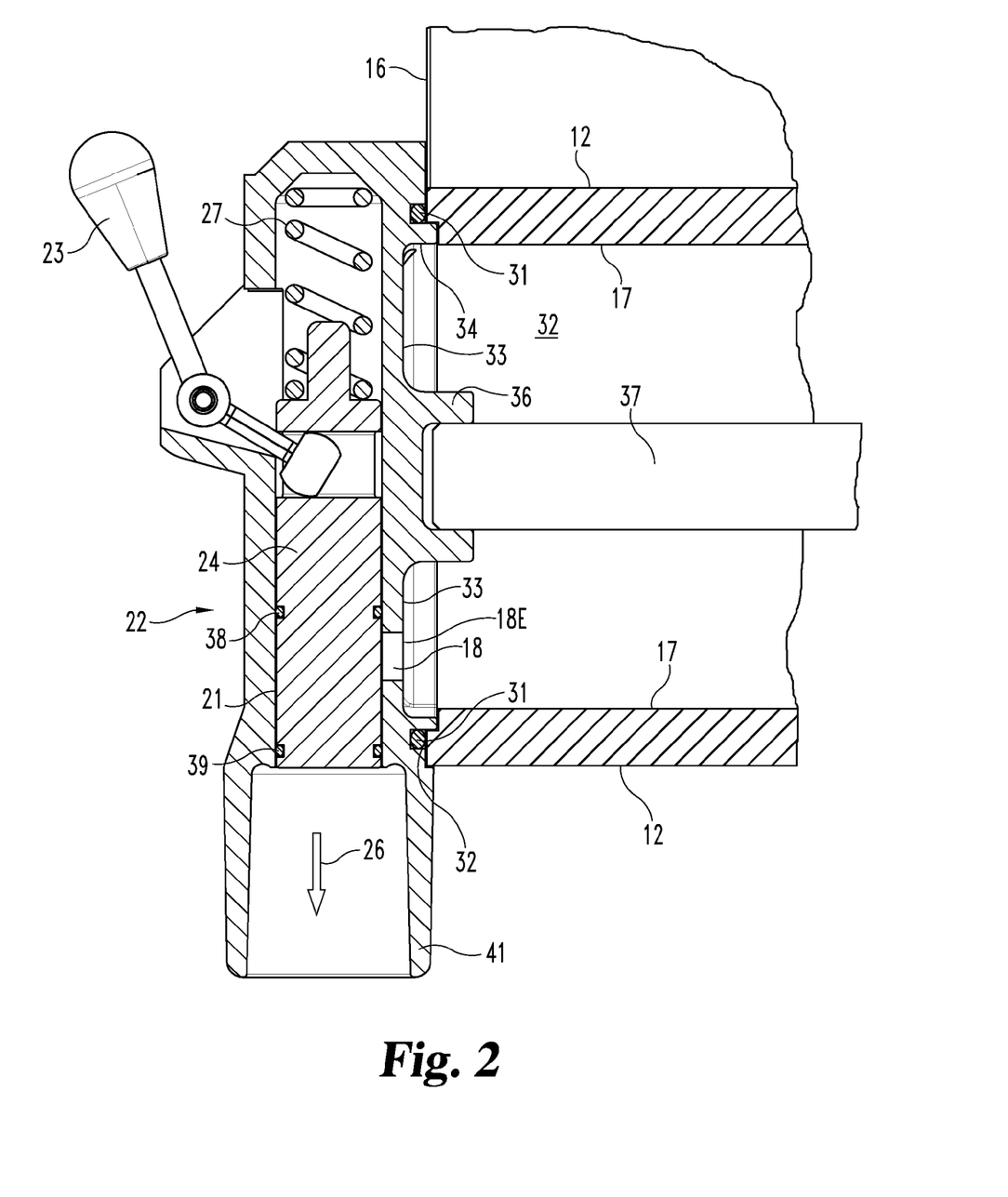
FIG. 2 is a section through one of the dispensing valve assemblies taken at line 2-2 in FIG. 1 and viewed in the direction of the arrows.
Figure 3:
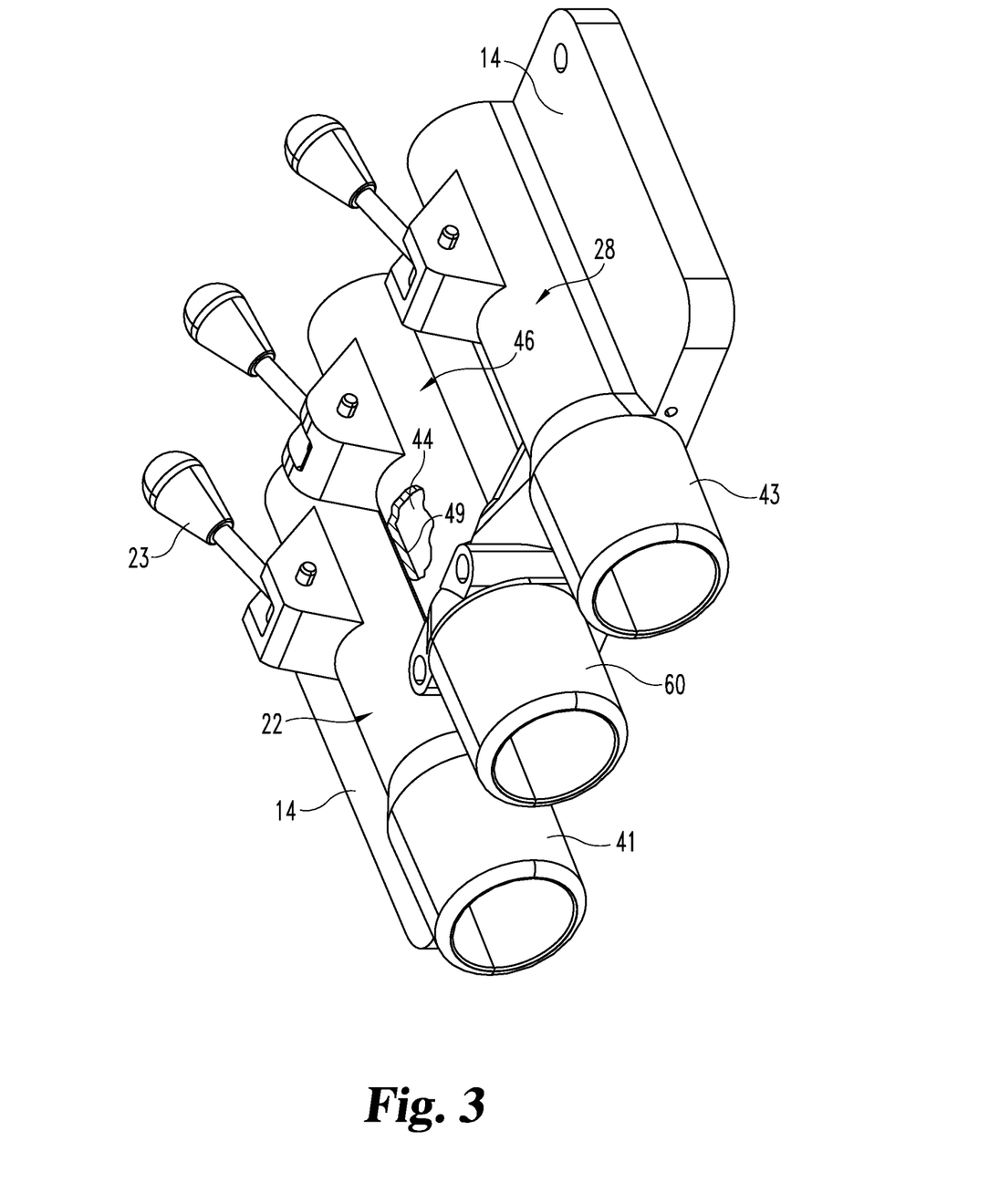
FIG. 3 is a perspective of the front of the dispensing head assembly viewed looking upward.
Figure 5:
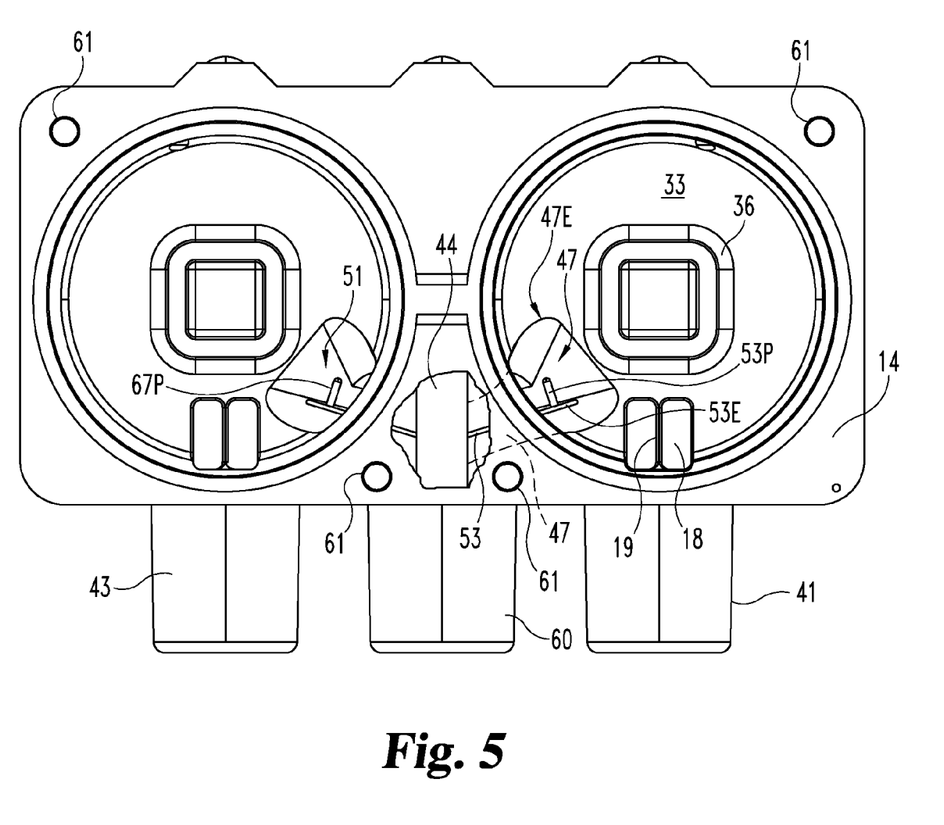
FIG. 5 is an orthographic back view of the dispenser head assembly.
Figure 6:
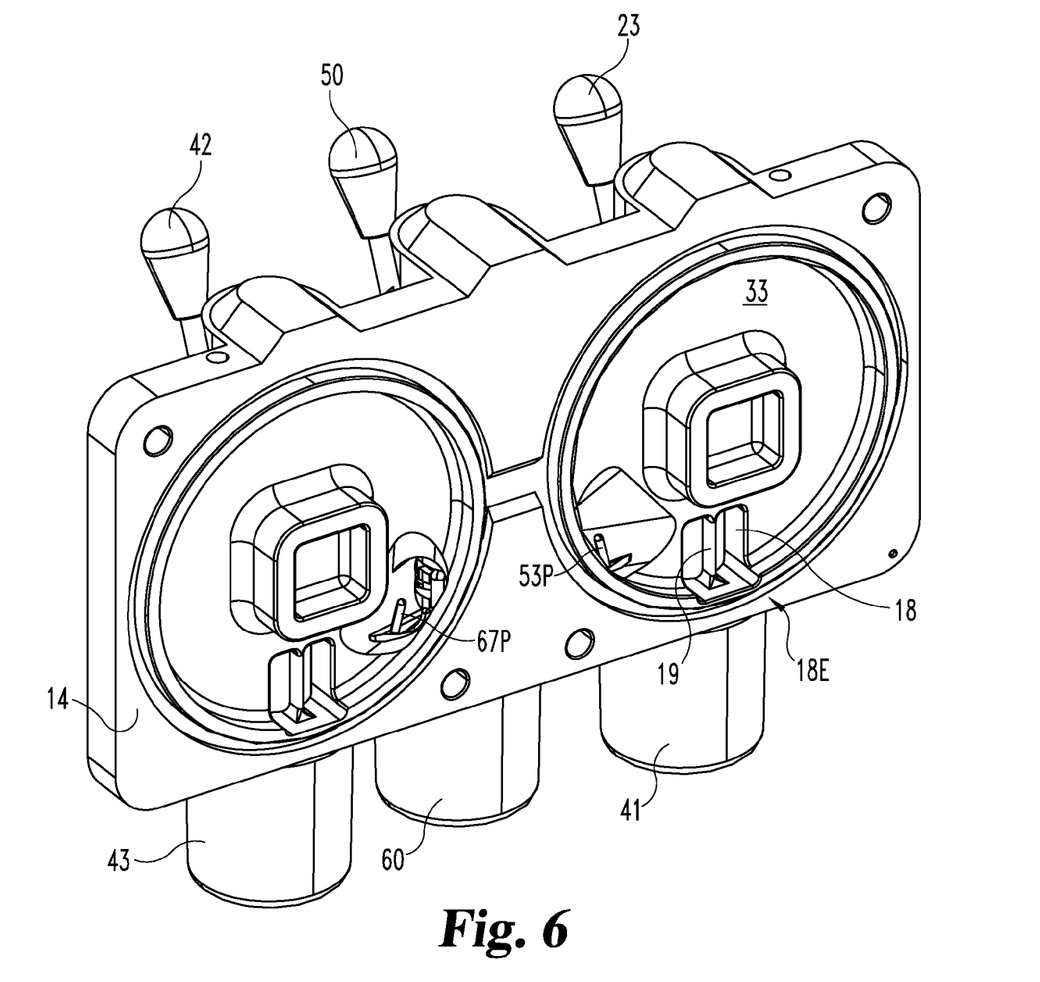
FIG. 6 is a perspective view of the back of the dispenser head assembly.

As shown in FIGS. 2, 5 and 6, a passage 18 opens at face 33 and communicates directly with the bore 21 of valve 22 of the dispenser head. Thus, a supply a soft-frozen beverage from cylinder 12 is always available for dispensing from the valve 22 by pulling down the handle 23 which lifts the piston 24 to discharge the beverage from the valve assembly downward in the direction of arrow 26 to dispense the beverage into a user's cup or other container when the valve is opened by pulling down the handle. A valve closing return spring 27 maintains a downward force on the valve to close the valve when the user releases the handle 23.

The same type of arrangement as described for the cylinder 12 and valve 22 is provided for cylinder 29 and valve assembly 28.

A rectangular boss 36 projects to the rear from the face 33 and receives a post 37 which is a part of the cylinder and remains stationary as a stirrer (not shown) rotates in the cylinder. The stirrer is a conventional part of the freezer cylinder and it functions to scrape the wall as well as affecting ice crystal size. The stirrer rotates in the cylinder to keep the frozen beverage in the freezer cylinder in a state where it can readily flow.

As described above, the beverage in the cylinder 12 is exposed to the back face 33 of the dispensing head 14. Referring to FIGS. 2 and 6, a passageway 18 is provided in the head and has an inlet port 18E in face 33 and extends to an exit at the bore 21 of valve assembly 22. The passageway entrance appears as a double opening. That is because there is a partition 19 which extends in the passageway 18 from the inlet port 18E to the passageway exit opening at the bore 21. It serves to prevent a person who might be servicing or cleaning the equipment from getting a finger into the path of the piston 24 in the bore at any time that the piston is being moved down in the bore 21 by the piston return spring 27. The piston seal in the bore is by O-ring 38 above the exit port of passageway 18 into the bore 21, and by O-ring 39, below the exit port. The additional function of the partition 19 is to help maintain the O-ring seal 39 in its groove as the seal crosses the passageway 18 exit port during the opening and closing of the valve 22.

With the apparatus as described to this point, dispensing a soft-frozen beverage from freezer cylinder 12 is accomplished by simply pulling down on knob 23 as discussed above. This raises the piston 24 enough to enable the beverage to flow through the inlet port 18E, through the passageway into the bore 21, and down in the direction of arrow 26 and out the beverage dispensing port 41. Dispensing of the soft-frozen beverage from cylinder 29 is accomplished in the same way by pulling the knob 42 to open the valve assembly 28 to discharge soft-frozen beverage from cylinder 29 through valve 28 and out through dispensing port 43.

To enable dispensing soft-frozen beverage from both cylinders simultaneously and, thereby providing a mix of the two beverages, the third valve assembly 46 is provided. This valve assembly is in communication with both cylinders at the same time by passageways opening in the back wall of the head at each of the cylinder receiver recesses, such as back face 33 for reception of cylinder 12. For cylinder 12, an opening 47E into passageway 47 provides entry of beverage from cylinder 12 down and forward to a side of piston 44 in bore 49 in head 14. The same arrangement in a mirror image is provided for freezer cylinder 29. Therefore, the piston 44 is operable by handle 50 to open the valve 46 and dispense soft-frozen beverages simultaneously from both of the cylinders 12 and 29 through passageway 47 for cylinder 12 and passageway 51 for cylinder 29.

Figure 4:
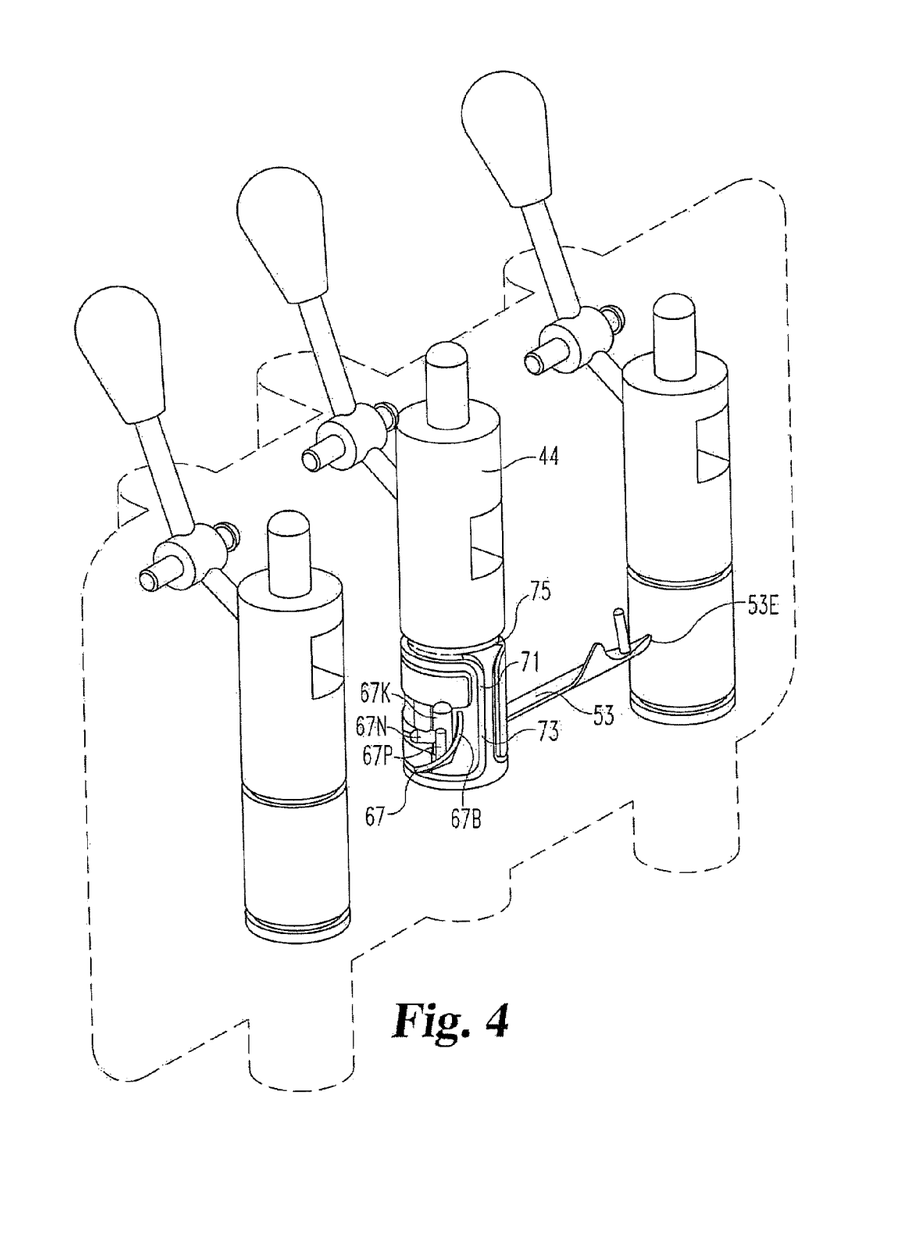
FIG. 4 is a perspective view from the back of the dispensing head assembly (outlined in dashed lines) and showing the dispenser valve pistons arranged in the formation that they are in cylinders (not shown) in the head, and with ice clog inhibitor breakers extending laterally and slightly upward from the piston of the center valve as they extend into lateral passageways (not shown in this view) which passageways extend to and open at the back face of the head for receiving frozen beverages from the two beverage freezer cylinders.
Figure 4A:
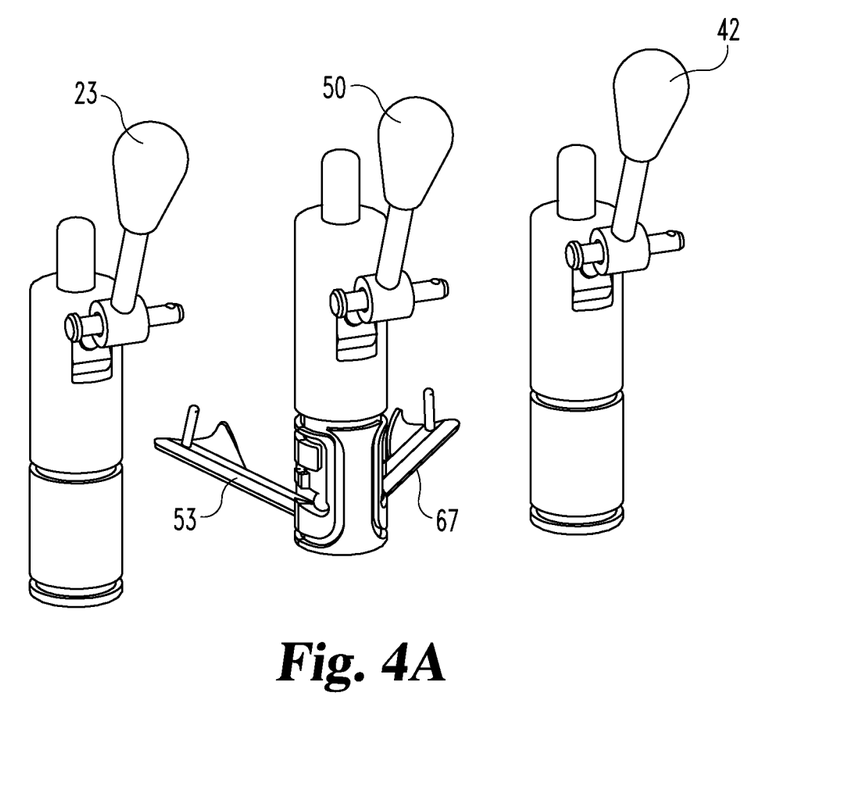
FIG. 4A is a view similar to FIG. 4 but viewed from the front.
Figure 7:
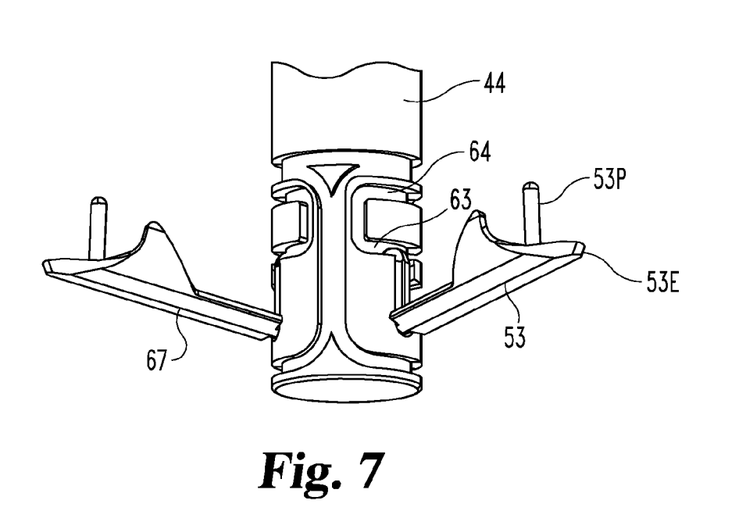
FIG. 7 is a view from the rear of the center valve piston (shown fragmentarily), and showing the clog breakers extending outward from the piston as they do in their respective passageways from the piston cylinder bore toward the passageway ports in the back face of the head where the passageways receive soft-frozen beverages from the respective freezer cylinders.

Passageways 47 and 51 are long enough between the faces such as 33 and the passageway exits into the valve bore 49 that if the handle 50 of the central valve 46 is not operated often enough to maintain a significant flow from the two beverage freezer cylinders, there is a possibility of ice accumulation in the passageways causing clogs. To inhibit development of clogging, or break a clog which has formed in one or the other of such passageways, two breakers are provided and extend outward from the piston 44 of the center valve assembly 46 toward the passageway entrances at cylinder receivers such as at 33 for cylinder 12. Referring to FIGS. 4, 5 and 7, for passageway 47, for example, a breaker 53 extends from a mounting in the side of the piston to a distal (tip) end 53E near the entrance 47E of channel 47 at the face 33 of the head 14. The proximal end 53X of the breaker at the piston is secured to the piston by an O-ring of shape fitting a somewhat serpentine groove 64 in the piston and extending around an upstanding outer surface 53S of a hub or key portion 53K of breaker 53 and holding the proximal end portion of the breaker 53 in an outwardly opening, axially extending slot 44S in the piston. Accordingly, the breaker 53 is confined in the slot so that whenever the piston 44 is raised or lowered, the breaker will be raised and lowered in the passageway 47 sufficiently high and low to enable the breaker to be moved up and down in the passageway, whereby any packed volume of ice crystals in the passageway 47 can be agitated such that displacement of the packed crystals occurs. When the valve is opened by pulling the handle, this will allow soft frozen beverage to flow from the freezer cylinder 12 down and out the valve dispensing outlet 60.

The same arrangement is provided for the passageway 51 serving the freezer cylinder 29, with a breaker 67 mounted in a slot in the piston 44 in the same way as breaker 53 is mounted in the piston. The breakers 53 and 67 are mirror images of one-another. Therefore, upon pulling handle 50, the piston 44 moves up to open the valve and the breakers will be pulled up in their respective passageways to loosen and move any potential ice clogs, and soft frozen beverages from both cylinders flow through their respective passageways into the valve bore 49 and downward and out through the dispensing port 60 into a cup or receiver placed under the port by the user. It can be noted in FIG. 5 that the passageways 47 and 51 slope downward and forward from their entrance face (such as 33 for passageway 47) to the bore for piston 44. The currently preferred slope is eleven to approximately fifteen degrees from horizontal.

Figure 8:
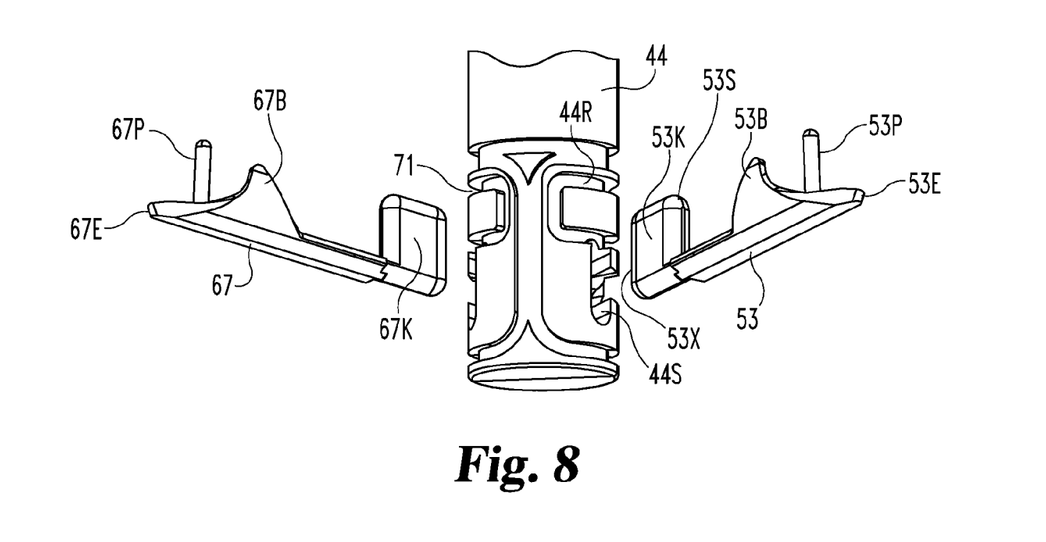
FIG. 8 is a view like that of FIG. 7 but showing the breakers separated from the piston as they would be before installation in the piston or after removal from the piston.

Referring to the breakers in more detail, breaker 53 is an example, and the description of it is useful for both 53 and 67, as they are mirror images. As shown in FIGS. 7 and 8 and some others, breaker 53 is elongate from a proximal end 53X outward to a distal end 53E. There is the upstanding hub key 53K at the proximal end. An upstanding post 53P is adjacent the distal end. A broad and up-curved surface is provided at 53B. The breaker is disposed in its respective passageway at slopes as mentioned above.

Figures 9, 10:
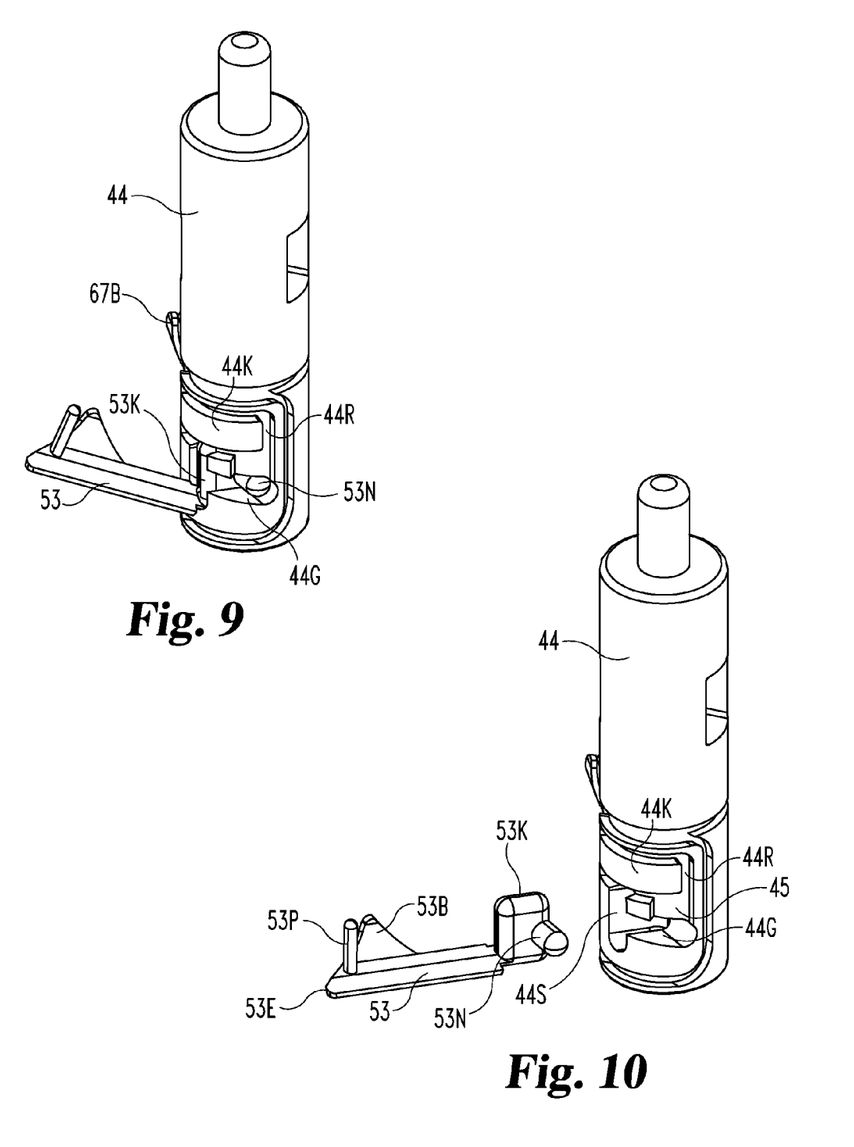
FIG. 9 is another view of the center valve piston rotated on its axis to show more detail of the mounting of the breaker in the piston.
FIG. 10 is a view like that of FIG. 9 but showing the breaker separated from the piston.

Referring to FIGS. 9 and 10, FIG. 10 shows a vertical slot 44S opening outward in the piston 44. This slot fittingly receives the key portion 53K of the breaker 53 from the bottom 44S of the slot to the top of the slot. Therefore when the piston is raised and lowered to respectively open and close the valve 46, the breaker captured in the slot will be raised and lowered likewise. The knob 53N projecting laterally from the key 53K is received in the groove 44G in the piston. As shown in FIG. 10, a groove 44R is provided in the piston surface. The groove follows a rectangular path in the surface of the piston resulting in a sort of knob 44K in the piston. As shown in FIG. 9, the rounded top of the key 53K projects slightly into the groove 44R under knob 44K. An O-ring is received in the groove 44R around the knob 44K and slightly covers the rounded side portion of the key 53K adjacent the top of the key, helping retain the breaker 53 in the slot 44S and groove 44G. As shown in FIG. 10, a recess 45 is provided at a portion of the bottom of groove 44R and extends down to groove 44G. It facilitates removal of an O-ring from grove 44R when desired.

Figure 11:
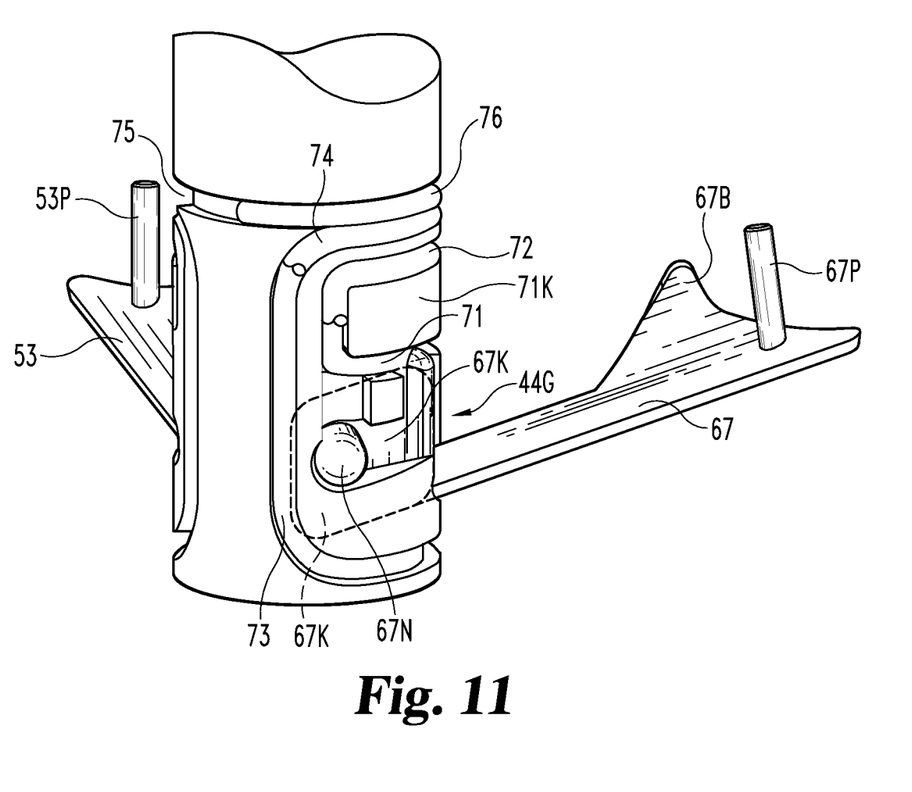
FIG. 11 is an enlarged view of the piston showing a breaker retainer pin in a groove in the piston.

Referring to FIG. 11, it shows the breaker 67 and its related mounting, the mirror image as that for breaker 53. A groove 71 in the piston surface follows a rectangular path surrounding the area occupied by the breaker key 67 receiver slot, mirror image to FIG. 10. The groove 71 receives an O-ring 72. This O-ring engages the top portion of key 67K of breaker 67 to retain it in the piston.

A groove 73 in the piston surface also follows a rectangular path surrounding the area of the breaker key receiver and retaining O-ring 72. Groove 73 receives O-ring 74 which serves as a piston-to-bore seal around the passageway 51.

A circumferential groove 75 in the piston receives O-ring 76 serving as a piston-to-bore seal around the entire circumference of the piston.

Referring back to FIGS. 5, 10 and 11, the post 53P adjacent the distal end of the breaker 53 is useful to a person as a handle to grip when installing or removing the breaker 53 during servicing or cleaning the equipment. When the breaker 53 is in position in the passageway 47, the post projects into the passageway as shown in FIG. 5 and is accessible to a servicing person to pull the breaker out of the piston 44. Then the piston can be removed from the bore 49 if desired for servicing or cleaning. The post 53P is also useful to push the breaker 53 in passageway 47 toward the piston and install the breaker key 53K into the slot 44S in the piston. While post 53P is useful for installation or removal of a breaker relative to the piston, a screw driver or similar tool can be used if desired to facilitate displacement of the O-ring from groove 44R (FIGS. 9 and 10) or O-ring 72 from groove 71 (FIG. 11) which retains the proximal end of the breaker, to get the O-ring out of the way for insertion or removal of the breaker relative to the piston.

So it is seen that these breakers are shaped in such a way that they provide for all the required functions of the parts: 1) a broad surface, preferably being substantially longer than it is wide to displace an optimum amount of the packed product along the path, 2) means, post 53P for example, for easy insertion into and from the dispensing head during assembly and disassembly, 3) fool-proof assembly of the correct breaker into the correct side, since the two breakers are not identical, but are mirror images of one another, 4) proper retention of the breaker during all modes of operation, and 5) minimal disruption of the product flow path when the center valve assembly 46 is open for dispensing the two icy beverages from the two freezer cylinders and which beverages may have different characteristics in the nature of color or flavor or whatever differences are peculiar to them.

A particular advantage of the illustrated embodiment of the current invention is a means to agitate this packed volume of ice crystals, such that displacement of the packed crystals occurs, allowing the mixed product from the main body of the freezing cylinder to flow through to the port of the dispensing valve. This enables the use of a relatively long flow channel to the center dispensing valve, allowing the centrally located beverage "twist" dispensing valve 46 and dispensing port 60 thereof to be located for maximum convenience for the user. A further advantage of this embodiment is the accomplishment of the agitation with a minimal number of parts and, therefore, optimum simplicity of the mechanism.

While a preferred embodiment of the invention has been illustrated and described in detail in the drawings and foregoing description, the same is to be considered as illustrative and not restrictive in character. Modifications that come within the spirit of the invention are desired to be protected.

The invention claimed is:

1. In a frozen beverage freezer having at least two cylinders, each cylinder containing a frozen beverage, and each cylinder having a beverage discharge outlet, and the freezer having a dispensing head with three outlets for dispensing frozen beverage from said cylinders into a user's container, and the freezer having passageways from said cylinder outlets to said dispensing head outlets, ice clog relief apparatus comprising:
   a valve operable, when actuated, to select and dispense from a selected one or the other or both of said cylinders a frozen beverage to be delivered and dispensed to a selected one of said outlets;
   two clog breakers, a different one of said breakers in each of said passageways from said cylinder outlets to said dispensing head outlets; and
   connections from said breakers to said valve and operable responsive to actuation of said valve to move in said passageways.

2. The apparatus of claim 1 and wherein:
   said breakers are connected to said valve to move simultaneously with said valve.

3. A dispensing assembly for a frozen beverage freezer and comprising:
   a dispensing head which at least two inlets for reception of soft-frozen beverages from beverage-containing cylinders, an outlet port for dispensing said soft-frozen beverages from said cylinders into a user's container, and a valve for selectively communicating said inlets with said outlet port; and
   a first passageway coupled to a first of said two inlets to receive said soft-frozen beverage from one of said cylinders into said dispensing head;
   an agitating device in said first passageway and coupled to said valve, and operable in concert with operation of said valve to inhibit occlusion of said first passageway with ice.

4. The dispensing assembly of claim 3 and further comprising:
   a second passageway coupled to a second of said inlets to receive a soft-frozen beverage from another of said cylinders into said dispensing head;
   a second agitating device, said second agitating device located in said second passageway and coupled to said valve, and operable in concert with operation of said valve to inhibit occlusion of said second passageway with ice.

5. The dispensing assembly of claim 3 and further comprising:
   a third inlet in said dispensing head to receive said soft-frozen beverage from said one of said cylinders;
   a second outlet port on said dispensing head;
   a second valve coupled between said third inlet and said second outlet port and operable, when actuated, enable passage of soft-frozen beverage from said one of said cylinders to said second outlet port for dispensing into a user's container.

6. Dispensing apparatus for a frozen beverage freezer and comprising:
   a valve which has an inlet for reception of soft-frozen beverages from at least two beverage-containing cylinders, and an outlet port for dispensing said soft-frozen beverages from said cylinders into a user's container, said valve being operable, when actuated, to enable passage of said soft-frozen beverages from said cylinders to said outlet port for delivery of said soft-frozen beverages from said cylinders into said user's container;
   a first passageway coupled to said inlet to receive said soft-frozen beverage from one of said cylinders into a dispensing head; and a device associated with said first passageway and coupled to said valve, and operable in concert with actuation of said valve to inhibit occlusion of said first passageway with ice.

7. The apparatus of claim 6 and wherein:
said device is an agitator.

8. The apparatus of claim 7 and wherein:
said agitator includes a mechanical breaker which extends outward from said valve inlet into said passageway.

9. The apparatus of claim 8 and wherein:
said valve includes a piston which reciprocates upon actuation, to initiate and terminate a dispensing event, and
said breaker is coupled to said piston to reciprocate with said piston and thereupon disrupt ice packing in said passageway.

10. The apparatus of claim 6 and further comprising:
a second valve which has an inlet for reception of soft-frozen beverages from said one of said beverage-containing cylinders, and an outlet port for dispensing said soft-frozen beverage from said one cylinders into a user's container, said second valve being operable, when actuated, to enable passage of said soft-frozen beverage from said one cylinder to said outlet port of said second valve for delivery of said soft-frozen beverage from said second cylinder into a user's container.

11. The apparatus of claim 10 and wherein:
said first passageway is coupled to said inlet of said second valve whereby said device is positioned to inhibit occlusion of passage of soft-frozen beverage from said one of said beverage-containing cylinders to said inlet of said second valve.

12. A dual dispensing confection machine comprising:
a. a first freezing compartment containing an agitator,
b. a second freezing compartment containing an agitator,
c. a dual dispensing valve having a first and second inlets, the first inlet coupling to said first freezing compartment and the second inlet coupling to said second freezing compartment,
d. a passageway to accomplish the coupling of said first inlet to said first freezing compartment,
e. a member associated with said passageway upstream from said first inlet that moves at about the same time when said dual dispensing valve is operated, to facilitate flow from said first freezing compartment to said first inlet.

13. The dual dispensing confection machine of claim 12 in which said member is mechanically coupled to the action of the dual dispensing valve to move when the valve moves.

14. The machine of claim 13 in which said member is within said passageway.

15. The machine of claim 12 in which said member's length is more than twice its width.

16. The machine of claim 12 in which said member has a handle at one end.

17. The machine of claim 16 in which said handle is a post.

* * * * *